United States Patent
Kugai et al.

(10) Patent No.: US 6,699,619 B2
(45) Date of Patent: Mar. 2, 2004

(54) NEGATIVE ELECTRODE OF A LITHIUM SECONDARY BATTERY WITH A TWO-LAYERED INORGANIC SOLID ELECTROLYTIC MATERIAL

(75) Inventors: Hirokazu Kugai, Itami (JP); Nobuhiro Ota, Itami (JP); Shosaku Yamanaka, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 12 days.

(21) Appl. No.: 09/838,182

(22) Filed: Apr. 20, 2001

(65) Prior Publication Data

US 2002/0018939 A1 Feb. 14, 2002

(30) Foreign Application Priority Data

Jun. 8, 2000 (JP) ........................................ 2000-172073

(51) Int. Cl.⁷ .......................... H01M 10/08; H01M 4/76
(52) U.S. Cl. .................. 429/231.95; 429/322; 429/246
(58) Field of Search .................... 429/231.95, 322, 429/246

(56) References Cited

U.S. PATENT DOCUMENTS 6,365,300 B1 * 4/2002 Ota ............................ 429/304

FOREIGN PATENT DOCUMENTS

| JP | 5-48582 | 7/1993 |
| JP | 2000340257 A | 12/2000 |

OTHER PUBLICATIONS

"Thin–film preparation of the $Li_2S$–$GeS_2$–$Ga_2S_3$ glass system by sputtering", M. Yamashita et al., Solid State Ionics 89, Jan. 20, 1996, pp. 299–304.

"Application of $Li_3PO_4$–$Li_2S$–$SiS_2$ glass to solid state secondary batteries", Kazuya Iwamoto et al., Solid State Ionics 79, 1995, pp. 288–291.

"Thermal and electrical properties of rapidly quenched glasses in the systems $Li_2S$–$SiS_2$–$Li_xMO_y$ ($Li_xMO_y$= $Li_4SiO_4$, $Li_2SO_4$)", Koichi Hirai et al., Solid State Ionics 78, Feb. 12, 1995, pp. 269–273.

* cited by examiner

Primary Examiner—Mark Ruthkosky
(74) Attorney, Agent, or Firm—McDermott, Will & Emery

(57) ABSTRACT

A lithium-secondary-battery negative electrode having a protective layer to prevent the surface deterioration of the inorganic solid electrolytic layer. The negative electrode comprises metallic lithium or a lithium-containing metal, a first inorganic solid electrolytic layer (thickness: a) formed on the metal, and a second inorganic solid electrolytic layer (thickness: b) formed on the first inorganic solid electrolytic layer. The thickness ratio b/a is specified to be more than 0.5.

7 Claims, 1 Drawing Sheet

NEGATIVE ELECTRODE OF A LITHIUM SECONDARY BATTERY WITH A TWO-LAYERED INORGANIC SOLID ELECTROLYTIC MATERIAL

BACKGROUND OF THE INVENTION

1. Field of the Invention

The present invention relates to a material for the negative electrode of a lithium secondary battery.

2. Related Background Arts

Lithium secondary batteries having organic electrolysis solutions have been widely used. Their advantage is the high energy output per unit volume or unit weight in comparison with other batteries. In exploiting this advantage, researchers and engineers have been advancing the development and practical applications of the batteries as power sources for mobile communication devices, notebook-type personal computers, and electric cars.

In order to improve the performance of a lithium secondary battery, attempts have been made to use metallic lithium as the negative electrode. However, the repetition of charge and discharge causes dendritic metallic lithium to grow on the surface of the negative electrode. This may lead to an internal short circuit between the negative and positive electrodes, ultimately triggering explosion. To avoid this hazardous situation, engineers have been studying the formation of an inorganic solid electrolytic layer as the electrolyte on the metallic lithium. They have also been studying the formation of a protective layer to prevent the surface deterioration of the inorganic solid electrolytic layer.

However, it remains to be found how the thickness of the inorganic solid electrolytic layer and the protective layer is to be selected in order to obtain a lithium secondary battery having high charge-discharge efficiency and an excellent charge-discharge-cycle performance.

If the inorganic solid electrolytic layer is excessively thick, the prolonged film-formation time increases the production cost, and bending or other external force exerted during the battery-manufacturing process tends to generate large cracks in the layer.

SUMMARY OF THE INVENTION

An object of the present invention is to offer negative electrode that provides excellent performance to a lithium secondary battery.

The present invention offers a lithium-secondary-battery negative electrode that comprises metallic lithium or a lithium-containing metal, a first inorganic solid electrolytic layer formed on the metal, and a second inorganic solid electrolytic layer formed as a protective layer on the first inorganic solid electrolytic layer. In the foregoing negative electrode, when the ratio of the thickness b of the second inorganic solid electrolytic layer to the thickness a of the first inorganic solid electrolytic layer b/a is more than 0.5, a lithium secondary battery that has an excellent charge-discharge-cycle performance can be obtained. It is more desirable that the ratio b/a be 1 or more.

However, if the second inorganic solid electrolytic layer is excessively thick, although the effect of coating is enhanced, the ionic conductivity decreases and the amount of the second inorganic solid electrolytic layer that dissolves in the electrolyte increases, thereby degrading the performance of the battery. Therefore, it is desirable that the foregoing ratio b/a be less than 2.

It is desirable that the thickness a of the first inorganic solid electrolytic layer be less than 1 $\mu$m. The thickness less than 1 $\mu$m can reduce the production cost and suppress the generation of large cracks when bending or other external force is exerted on the layer during the battery-manufacturing process.

The first inorganic solid electrolytic layer may comprise a sulfide-containing lithium-ion-conductive compound, desirably a sulfide-containing lithium-ion-conductive compound that contains at least one member selected from the group consisting of $Li_3PO_4$, $Li_4SiO_4$, and $Li_2SO_4$.

It is desirable that the second inorganic solid electrolytic layer comprise a constituent contained in the first inorganic solid electrolytic layer except sulfide. This condition enables a satisfactory second inorganic solid electrolytic layer to grow on the first inorganic solid electrolytic layer. The second inorganic solid electrolytic layer may comprise a lithium compound containing at least one member selected from the group consisting of $Li_3PO_4$, $Li_4SiO_4$, and $Li_2SO_4$.

The first and second inorganic solid electrolytic layers may be amorphous.

The present invention enables the production of a highly stable lithium secondary battery having high energy density and an excellent charge-discharge-cycle performance.

DETAILED DESCRIPTION

Figure 1:
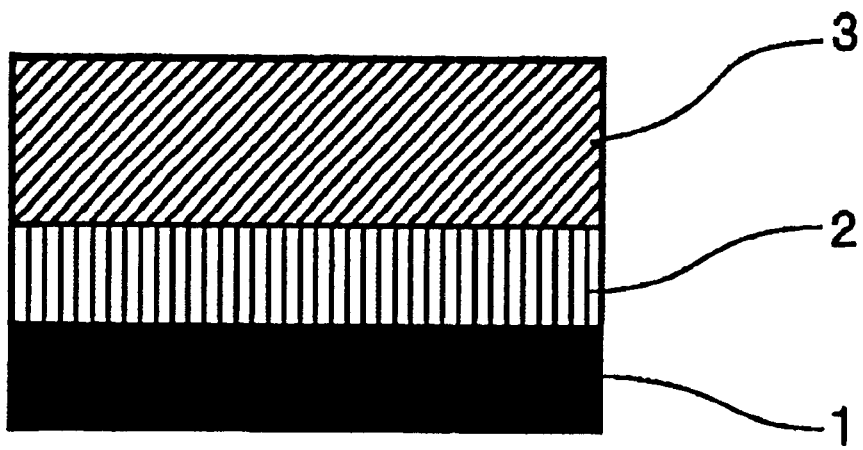
FIG. 1 is a diagram showing the constitution of the lithium-secondary-battery negative electrode of the present invention.

Concrete embodiments of the present invention are explained in the following examples. The present invention, however, is not limited by these examples.

As shown in FIG. 1, the lithium-secondary-battery negative electrode of the present invention comprises metallic lithium or a lithium-containing metal 1, a first inorganic solid electrolytic layer 2, and a second inorganic solid electrolytic layer 3.

EXAMPLE 1

A sheet of copper foil, 100 $\mu$m in thickness and 100×50 mm in size, to be used as a collector was laminated with a sheet of metallic-lithium foil having a thickness of 50 $\mu$m and the same size as the copper foil. A first inorganic solid electrolytic layer was formed on the metallic lithium by the sputtering method using an $Li_2S$—$SiS_2$—$Li_3PO_4$ target in an argon-gas atmosphere at room temperature. A second inorganic solid electrolytic layer was formed as a protective layer on the first inorganic solid electrolytic layer by the sputtering method using an $Li_3PO_4$ target in an argon-gas atmosphere at room temperature. The thickness of the layers was varied. Tables 1 and 2 show the thickness a of the first inorganic solid electrolytic layer, the thickness b of the second inorganic solid electrolytic layer, and the ratio b/a of the produced samples.

TABLE 1

| Sample No. | Thickness a ($\mu$m) | Thickness b ($\mu$m) | b/a | Battery performance |
|---|---|---|---|---|
| 1-1 | 0.8 | 0.45 | 0.56 | Δ |
| 1-2 | 0.8 | 0.6 | 0.75 | ○ |

TABLE 1-continued

| Sample No. | Thickness a (μm) | Thickness b (μm) | b/a | Battery performance |
|---|---|---|---|---|
| 1-3 | 0.8 | 0.8 | 1 | ⊚ |
| 1-4 | 0.8 | 1.4 | 1.75 | ⊚ |
| 1-5 | 0.8 | 1.6 | 2 | ○ |
| 1-6 | 0.8 | 2.4 | 3 | ○ |

Note:
⊚: stable after 500 cycles or more
○: stable after 300 cycles or more and less than 500 cycles
Δ: stable after 100 cycles or more and less than 300 cycles

TABLE 2

| Sample No. | Thickness a (μm) | Thickness b (μm) | b/a | Battery performance |
|---|---|---|---|---|
| 2-1 | 3 | 4.5 | 1.5 | ○ |
| 2-2 | 1 | 1.5 | 1.5 | ○ |
| 2-3 | 0.8 | 1.2 | 1.5 | ⊚ |
| 2-4 | 0.1 | 0.15 | 1.5 | ⊚ |
| 2-5 | 1 | 3 | 3 | Δ |
| 2-6 | 0.8 | 2.4 | 3 | ○ |
| 2-7 | 0.1 | 0.3 | 3 | ○ |

Note:
⊚: stable after 500 cycles or more
○: stable after 300 cycles or more and less than 500 cycles
Δ: stable after 100 cycles or more and less than 300 cycles The structure of the negative electrode was the same as that shown in FIG. 1; i.e., the negative electrode comprised metallic lithium, a first inorganic solid electrolytic layer, and a second inorganic solid electrolytic layer. X-ray diffraction results showed that these inorganic solid electrolytic layers were amorphous.

An electrolyte, $LiPF_6$, was dissolved in a mixed liquid of ethylene carbonate (EC) and propylene carbonate (PC). The mixed liquid was heated to dissolve polyacrylonitrile (PAN). Thus, the mixed liquid contained a high concentration of PAN. The mixed liquid was cooled to obtain a gelatinous electrolyte comprising $LiPF_6$, EC, PC, and PAN. A powder of $LiCoO_2$ to be used as an active material and a carbon powder that gives electronic conductivity were mixed into the gelatinous electrolyte. The gelatinous electrolyte was applied onto a sheet of aluminum foil (a positive-electrode-side collector), 20 μm in thickness, to obtain a positive electrode. The layer of the gelatinous electrolyte had a thickness of 300 μm. The metallic lithium on which inorganic solid electrolytic layers were formed was coupled with the foregoing positive electrode to produce a battery.

The charge and discharge performance of the produced batteries was evaluated. Each battery showed the following results: With a charged voltage of 4.2 V, when the battery was discharged at a rate of 100 mA, it showed a current capacity of 0.5 Ah (ampere hour) before the terminal voltage decreased to 3.5 V. The energy density was 490 Wh/l (watt hour/liter).

The charge and discharge cycle was repeated 500 times or more under the same condition as described above. The results are shown in Tables 1 and 2. In the column "battery performance" in these tables, the sign "⊚" signifies that the battery was stable after 500 cycles or more; "○", stable after 300 cycles or more and less than 500 cycles; and "Δ", stable after 100 cycles or more and less than 300 cycles.

The performance-evaluation results in Table 1 demonstrate that it is necessary that the ratio of the thickness b of the second inorganic solid electrolytic layer to the thickness a of the first inorganic solid electrolytic layer b/a be more than 0.5. The results also demonstrate that it is desirable that the ratio b/a be 1 or more, and less than 2.

The performance-evaluation results in Table 2 demonstrate that it is desirable that the thickness a of the first inorganic solid electrolytic layer be less than 1 μm.

EXAMPLE 2

In the structure used in Example 1, the first inorganic solid electrolytic layer was changed to an $Li_2S$—$SiS_2$—$Li_4SiO_4$ composition and the second inorganic solid electrolytic layer was changed to $Li_4SiO_4$. With other conditions unchanged, experiments similar to those in Example 1 were carried out. The results obtained were the same as those shown in Tables 1 and 2.

EXAMPLE 3

In the structure used in Example 1, the first inorganic solid electrolytic layer was changed to an $Li_2S$—$SiS_2$—$Li_2SO_4$ composition and the second inorganic solid electrolytic layer was changed to $Li_2SO_4$. With other conditions unchanged, experiments similar to those in Example 1 were carried out. The results obtained were the same as those shown in Tables 1 and 2.

What is claimed is:

1. A lithium-secondary-battery negative electrode comprising metallic lithium or a lithium-containing metal, a first inorganic solid electrolytic layer, containing $Li_2S$, $SiS_2$ and $Li_3PO_4$, formed on the metal, and a second inorganic solid electrolytic layer, containing at least one member selected from the group consisting of $Li_3PO_4$, $Li_4SiO_4$ and $Li_2SO_4$, formed on the first inorganic solid electrolytic layer, in which the ratio of the thickness b of the second inorganic solid electrolytic layer to the thickness a of the first inorganic solid electrolytic layer b/a is more than 0.5.

2. The lithium-secondary-battery negative electrode as defined in claim 1, wherein the ratio b/a is 1 or more.

3. The lithium-secondary-battery negative electrode as defined in claim 2, wherein the ratio b/a is less than 2.

4. A lithium-secondary-battery negative electrode as defined in claim 1, wherein the thickness a is less than 1 μm.

5. A lithium-secondary-battery negative electrode as defined in claim 1, wherein the first inorganic solid electrolytic layer is a lithium-ion-conductive compound containing sulfide.

6. A lithium-secondary-battery negative electrode as defined in claim 1, wherein the second inorganic solid electrolytic layer is a lithium-ion-conductive compound containing no sulfide.

7. A lithium-secondary-battery negative electrode as defined in claim 1, wherein the first and second inorganic solid electrolytic layers are amorphous.

* * * * *